(12) United States Patent
Seeger et al.

(10) Patent No.: US 7,290,435 B2
(45) Date of Patent: Nov. 6, 2007

(54) METHOD AND APPARATUS FOR ELECTRONIC CANCELLATION OF QUADRATURE ERROR

(75) Inventors: Joseph Seeger, Menlo Park, CA (US); Ali Rastegar, Gilroy, CA (US); Milton T. Tormey, Los Altos, CA (US)

(73) Assignee: Invensense Inc., Sunnyvale, CA (US)

( * ) Notice: Subject to any disclaimer, the term of this patent is extended or adjusted under 35 U.S.C. 154(b) by 0 days.

(21) Appl. No.: 11/347,978

(22) Filed: Feb. 6, 2006

(65) Prior Publication Data

US 2007/0180908 A1   Aug. 9, 2007

(51) Int. Cl.
*G01P 21/00* (2006.01)
*G01P 19/00* (2006.01)
(52) U.S. Cl. .................... 73/1.37; 73/504.12
(58) Field of Classification Search ........ 73/1.37–1.38, 73/504.04, 504.02, 504.12, 504.13, 504.14, 73/504.15, 504.16
See application file for complete search history.

(56) References Cited

U.S. PATENT DOCUMENTS

| | | | | |
|---|---|---|---|---|
| 4,511,848 A | * | 4/1985 | Watson | 329/349 |
| 5,481,914 A | * | 1/1996 | Ward | 73/504.16 |
| 5,703,292 A | * | 12/1997 | Ward | 73/504.02 |
| 6,067,858 A | * | 5/2000 | Clark et al. | 73/504.16 |
| 6,230,563 B1 | * | 5/2001 | Clark et al. | 73/504.04 |
| 6,370,937 B2 | * | 4/2002 | Hsu | 73/1.37 |
| 6,445,195 B1 | | 9/2002 | Ward | 324/684 |
| 6,571,630 B1 | | 6/2003 | Weinberg et al. | 73/504.16 |
| 6,854,315 B2 | * | 2/2005 | Wyse | 73/1.38 |
| 7,051,590 B1 | * | 5/2006 | Lemkin et al. | 73/504.04 |

OTHER PUBLICATIONS

Yazdi, Navid et al., "Micromachined Intertial Sensors," Proceedings of the IEEE, vol. 86, No. 8, Aug. 1998, pp. 1640-1659.

* cited by examiner

*Primary Examiner*—Helen Kwok
(74) *Attorney, Agent, or Firm*—Sawyer Law Group LLP

(57) ABSTRACT

Methods and apparatus are provided for detecting a rate of rotation. In one implementation, the method includes vibrating a proof mass at a pre-determined frequency in a drive axis. In response to a rotation, sensing an amount of deflection of the proof mass in an axis orthogonal to the drive axis, in which the amount of deflection is sensed as a change in charge. The method further includes generating a quadrature error cancellation signal to substantially cancel quadrature error from the sensed change in charge.

17 Claims, 4 Drawing Sheets

METHOD AND APPARATUS FOR ELECTRONIC CANCELLATION OF QUADRATURE ERROR

FIELD OF THE INVENTION

The present invention relates generally to MEMS gyroscopes, and in particular methods for compensating for quadrature error in MEMS gyroscopes.

BACKGROUND OF THE INVENTION

Measuring rate of rotation is generally implemented through the use of gyroscopes. Gyroscopes can be fabricated using MEMS (microelectromechanical systems) techniques.

FIG. 1 shows a conventional MEMS gyroscope 100 for measuring rate of rotation. MEMS gyroscope 100 includes a suspension frame 102, springs 104-106, a proof mass 108, and a sense mass 110. Proof mass 108 and sense mass 110 are suspended to suspension frame 102 by springs 104-106. In operation, proof mass 108 is vibrated (or driven), e.g., by electrostatic actuation, along the x-axis and (ideally) sense mass 110 does not move. In response to a rotation about the z-axis, proof mass 108 deflects out of the drive axis (i.e., the x-axis) and exhibits a vibration in an axis (i.e., the y-axis) that is orthogonal to the drive axis. Sense mass 110, in turn, vibrates in concert with proof mass 108 along the orthogonal axis. Thus, in the ideal case, sense mass 110 only moves (or vibrates) in response to rotation of MEMS gyroscope 100.

The orthogonal vibration is caused by Coriolis forces that arise from rotation of MEMS gyroscope 100 about the z-axis and act upon proof mass 108 and sense mass 110. The amplitude of the Coriolis-induced orthogonal vibration (referred to herein as Coriolis signal) is typically sensed as a change in capacitance (or charge) between sense mass 110 and an electrode (not shown) fixedly positioned on suspension frame 102. The change in capacitance is converted to a corresponding voltage or current signal (within a sense mass position sensor), electronically amplified, and output as the measured rate of rotation of MEMS gyroscope 100. The change in capacitance, and thus the Coriolis signal, is generally extremely small (e.g., on the order of 10 atto Farads).

Due to undesirable mechanical coupling between proof mass 108 and sense mass 110 caused by, for example, manufacturing imperfections in conventional MEMS gyroscopes, a large error signal can be present along with the relatively small (desired) Coriolis signal. The large error signal is typically in quadrature phase—i.e., 90 degrees relative—with the Coriolis signal and is commonly known as quadrature error.

Various attempts have been made to compensate for quadrature error by modifying the behavior of one or more mechanical elements that are in quadrature phase with the Coriolis signal. For example, in U.S. Pat. No. 6,445,195, entitled "Drive Feedthrough Nulling System", quadrature error is compensated by applying a time varying electrostatic force to a portion of mechanical elements of a MEMS gyroscope to cancel undesired motion within the MEMS gyroscope. Because an electrostatic force is used to cancel the undesired motion within the MEMS gyroscope, a voltage of similar magnitude to voltages used to originally vibrate (or drive) a proof mass within the MEMS gyroscope is needed. Such voltages are generally greater than 10V and are relatively expensive in terms of silicon area (and thus product cost) to generate and control.

Another technique for compensating for quadrature error consists of modifying the mechanical properties of the drive and sense mechanical elements of a MEMS gyroscope through a trimming technique as discussed in U.S. Pat. No. 6,571,630, entitled "Dynamically Balanced Microelectromechanical Devices". In this approach, the mechanical properties of the drive and sense mechanical elements are modified by using lasers to remove small amounts of material in order to correct lithographic or etching imperfections. Such a technique generally requires expensive specialized instrumentation and test structures to trim the drive and sense mechanical elements while at the same time testing the gyroscope. This technique, therefore, is not cost effective for the production of low cost, high volume MEMS gyroscopes.

Yet another technique to compensate for quadrature error includes attempting to cancel the quadrature error after the sensed change in capacitance (or charge) has been converted to a voltage or current signal—i.e., after the C-to-V (capacitance-to-voltage) or C-to-I (capacitance-to-current) circuit and prior to any de-modulation. However, the quadrature error signal can be so large that operation of the C-to-V or C-to-I circuit is severely impacted—that is, the dynamic range of the input of the C-to-V or C-to-I circuit must accommodate the large quadrature error as well as the small Coriolis signal. Thus, more gain is typically required within sensing electronics of a MEMS gyroscope after the point in the electronics at which the quadrature has been compensated for as compared to the amount of gain necessary had the quadrature error not been present and, therefore, the resulting effective signal-to-noise performance of the MEMS gyroscope will be reduced.

Accordingly, what is needed is an improved technique for compensating for quadrature error that avoids a need for large voltages to apply an electrostatic force to mechanical elements and avoids any compromise to sensing electronics within a MEMS gyroscope, and which is further generally cost-effective for production of low cost, high volume MEMS gyroscopes. The present invention addresses such a need.

BRIEF SUMMARY OF THE INVENTION

In general, in one aspect, this specification describes a method for detecting a rate of rotation. The method includes vibrating a proof mass at a pre-determined frequency in a drive axis. In response to a rotation, sensing an amount of deflection of the proof mass in an axis orthogonal to the drive axis, in which the amount of deflection is sensed as a change in capacitance (charge). The method further includes generating a quadrature error cancellation signal to substantially cancel quadrature error from the sensed change in capacitance (charge).

Particular implementations can include one or more of the following features. The method can further include capacitively coupling the quadrature error cancellation signal to the sensed change in charge prior to the conversion of that signal (charge) to voltage or current. The method can further include converting the sensed change in charge having quadrature error substantially removed therefrom into a corresponding voltage or current. Generating a quadrature error cancellation signal can include generating the quadrature error cancellation signal based on a feedback loop that runs continuously to substantially cancel quadrature error from the sensed change in charge. Generating the quadrature error cancellation signal based on a feedback loop can include measuring an amount of quadrature error contained within the corresponding voltage or current using the drive signal that is used to vibrate the proof mass as a reference. The quadrature error cancellation signal can be derived from a drive signal within the drive circuit that is used to vibrate the proof mass. The method can further include scaling the drive signal, and generating the quadrature error cancellation signal can include generating the quadrature error cancellation signal based on the scaled drive signal. The method can further include storing one or more pre-determined digital codes that each represents a particular scale factor for scaling the drive signal, and scaling the drive signal can include scaling the drive signal based on a selected one of the one or more pre-determined digital codes to minimize quadrature error within the sensed change in charge. The one or more pre-determined digital codes can be determined during production testing of the sensor.

In general, in another aspect, this specification describes a sensor operable to detect a rate of rotation. The sensor includes a proof mass, a drive circuit to vibrate the proof mass at a pre-determined frequency in a drive axis, and an electrode operable to sense an amount of deflection of the proof mass in an axis orthogonal to the drive axis in response to a rotation of the sensor. The electrode senses the amount of deflection as a change in charge. The sensor further includes a quadrature error cancellation circuit operable to generate a quadrature error cancellation signal to substantially cancel quadrature error from the sensed change in charge.

Particular implementations can include one or more of the following features. The quadrature error cancellation signal can be capacitively coupled to the sensed change in charge. The sensor can further include a sense mass position sensor circuit operable to receive the sensed change in charge having quadrature error substantially removed therefrom and convert the received sensed change in charge into a corresponding voltage or current. The quadrature error cancellation circuit can generate the quadrature error cancellation signal based on a feedback loop that runs continuously to substantially cancel quadrature error from the sensed change in charge. The quadrature error cancellation circuit can include a demodulator operable to measure an amount of quadrature error contained within a signal from the sense mass position sensor circuit using a drive signal that is used to vibrate the proof mass within the drive circuit as a reference.

The quadrature error cancellation signal can be derived from a drive signal within the drive circuit that is used to vibrate the proof mass. The quadrature error cancellation circuit can further include an amplitude scaling circuit operable to scale the drive signal and generate the quadrature error cancellation signal based on the scaled drive signal. The quadrature error cancellation circuit can further include a memory operable to store one or more pre-determined digital codes that each represents a particular scale factor for scaling the drive signal. The amplitude scaling circuit can scale the drive signal based on a selected one of the one or more pre-determined digital codes to minimize quadrature error within the sensed change in charge.

Implementations may provide one or more of the following advantages. A MEMS gyroscope is provided that includes a quadrature error cancellation circuit that substantially cancels quadrature error prior to conversion of sensed capacitance (charge) change associated with a Coriolis signal being converted to a voltage or current. In one implementation, the quadrature error is substantially cancelled at the input of a sense mass position sensor circuit (which includes a C-I or C-V circuit). Accordingly, the invention avoids the need for large voltages to apply an electrostatic force to mechanical elements and avoids compromising position sensing electronics (e.g., the sense mass position sensor circuit) within a MEMS gyroscope. Thus, a MEMS gyroscope is provided that can retain a high signal-to-noise ratio and provide more accurate measurements of rate of rotation.

The details of one or more implementations are set forth in the accompanying drawings and the description below. Other features and advantages will be apparent from the description and drawings, and from the claims.

BRIEF DESCRIPTION OF SEVERAL VIEWS OF THE DRAWINGS

Like reference symbols in the various drawings indicate like elements.

DETAILED DESCRIPTION OF THE INVENTION

The present invention relates generally to MEMS gyroscopes, and methods for compensating for quadrature error in MEMS gyroscopes. The following description is presented to enable one of ordinary skill in the art to make and use the invention and is provided in the context of a patent application and its requirements. Various modifications to the preferred implementations and the generic principles and feature described herein will be readily apparent to those skilled in the art. Thus, the present invention is not intended to be limited to the implementations shown but is to be accorded the widest scope consistent with the principles and features described herein.

Figure 1:
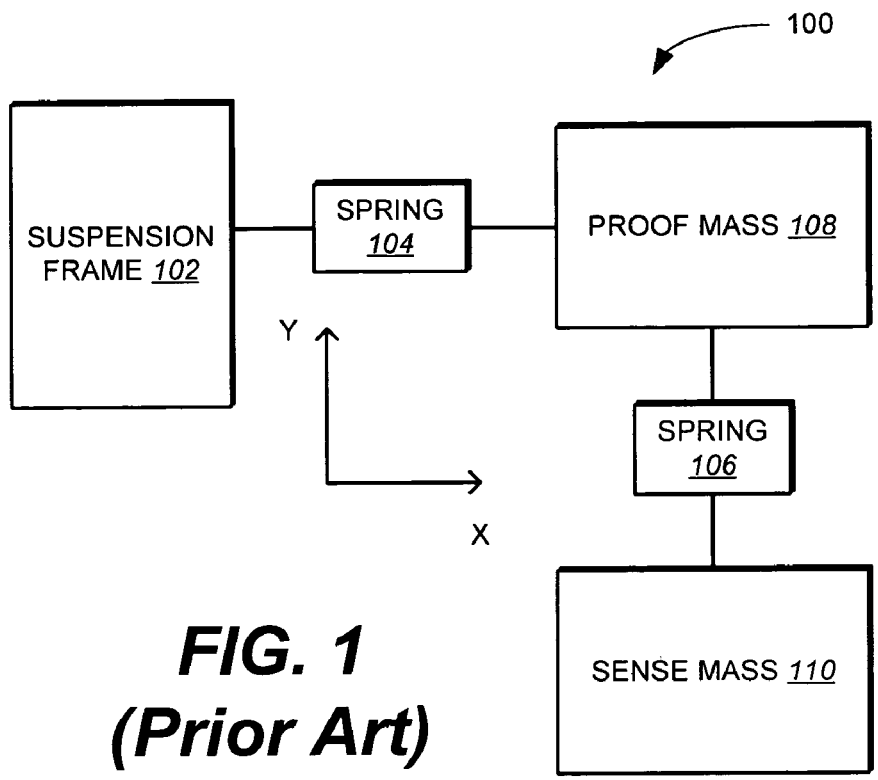
FIG. 1 is a block diagram of a conventional MEMS gyroscope.
Figure 2:
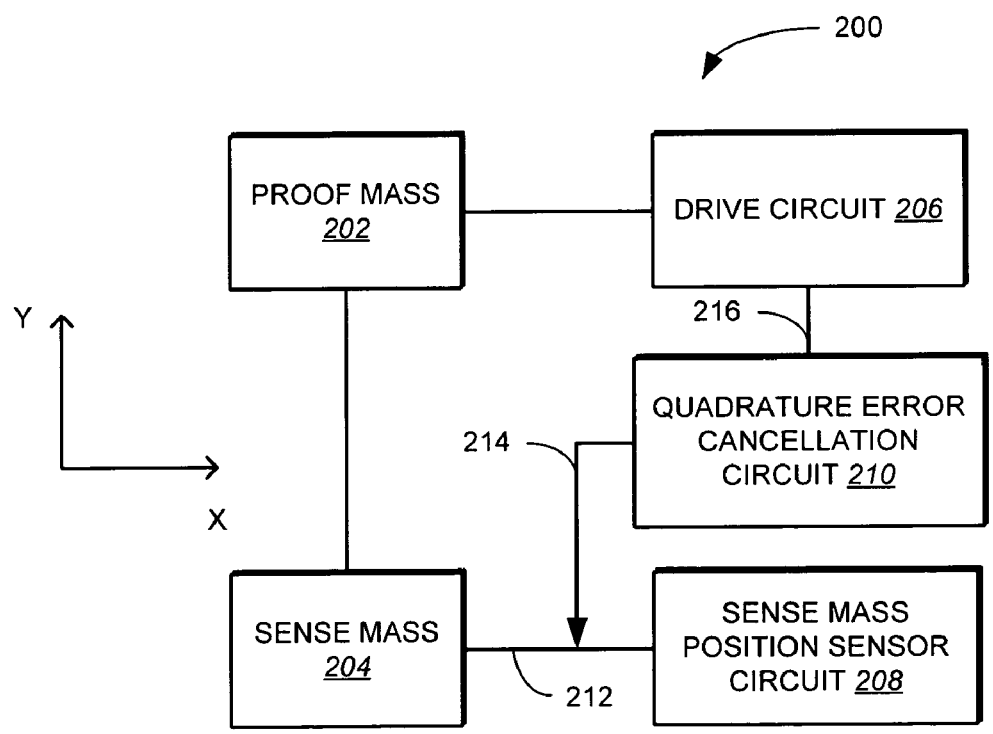
FIG. 2 is a block diagram of a MEMS gyroscope in accordance with the invention.

FIG. 2 shows a MEMS gyroscope 200 in accordance with the invention. MEMS gyroscope 200 can be a MEMS gyroscope as described in U.S. Pat. No. 6,892,575 —entitled "X-Y Dual-Mass Tuning Fork Gyroscope With Vertically Integrated Electronics and Wafer-Scale Hermetic Packaging", assigned to the assignee of the present invention and incorporated by reference herein. MEMS gyroscope 200 includes a proof mass 202, a sense mass 204, a drive circuit 206, a sense mass position sensor circuit 208, and a quadrature error cancellation circuit 210. Though a separate proof mass and sense mass are shown, MEMS gyroscope can include only a single proof mass that functions both as a proof mass and a sense mass. In addition, MEMS gyroscope 200 can include a different number of proof masses and/or sense masses.

In operation, drive circuit 206 vibrates proof mass 202 at a pre-determined frequency in a drive axis (e.g., along the x-axis). In one implementation, drive circuit 206 vibrates proof mass 202 at a resonant frequency associated with proof mass 202. In one implementation, drive circuit 206 vibrates proof mass through electrostatic actuation. Drive circuit 206 can implement other techniques for vibrating proof mass 202.

In response to a rotation about the z-axis, proof mass 202 deflects out of the drive axis (due to Coriolis forces) and exhibits a vibration in an axis (i.e., the y-axis) that is orthogonal to the drive axis. Sense mass 204, in turn, vibrates in concert with proof mass 202 along y-axis. In one implementation, an electrode (not shown) senses the amplitude of the vibration of sense mass 204. In one implementation, the electrode senses the amplitude of the vibration of sense mass 204 as a change in (electrical) charge or capacitance. A capacitance signal 212 representing the change in charge is input into sense mass position sensor circuit 208. Sense mass position sensor circuit 208 senses the amplitude of the vibration of sense mass 204 based on capacitance signal 212. In one implementation, sense mass position sensor circuit 208 includes a C-to-V circuit or a C-to-I circuit for converting capacitance signal 212 into a corresponding voltage or current, respectively.

Prior to sense mass position sensor circuit 208 sensing the amplitude of the vibration of sense mass 204 based on capacitance signal 212, quadrature error cancellation circuit 210 generates a quadrature error cancellation signal 214 that substantially cancels quadrature error within capacitance signal 212 (or the sensed change in charge). Accordingly, quadrature error is substantially compensated within MEMS gyroscope 200 prior to capacitance signal 212 (or the sensed change in charge) being converted to a current or voltage (by sense mass position sensor circuit 208). In one implementation, quadrature error cancellation signal 214 is capacitively coupled to capacitance signal 212. Accordingly, electrical charge can be injected into the sensed change in charge to substantially remove quadrature error from the sensed change in charge. Quadrature error cancellation signal 214 can be generated based on a feedback signal 216 received from drive circuit 206, as discussed in greater detail below.

Figure 3:
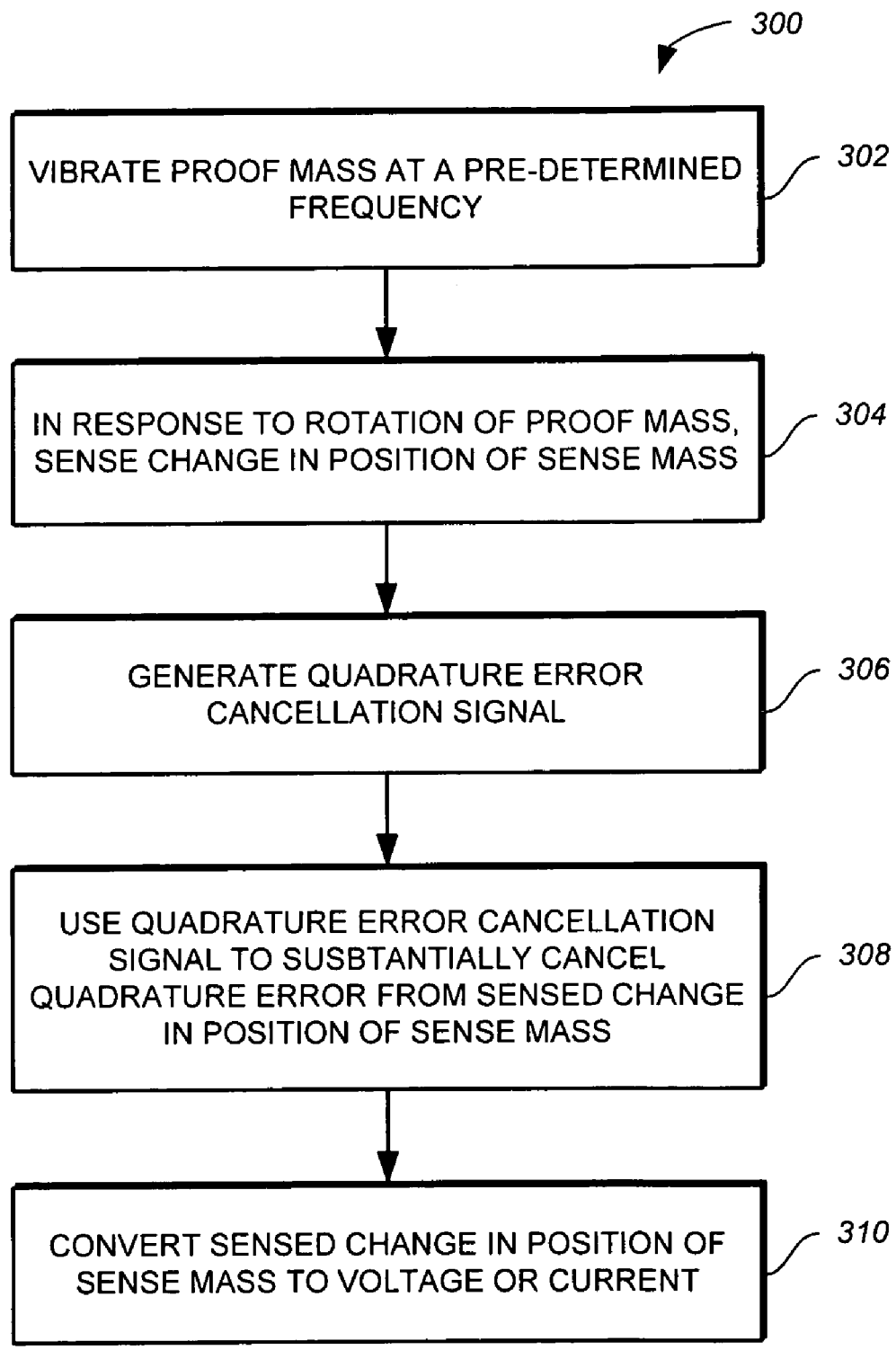
FIG. 3 shows a method in accordance with the invention for cancelling quadrature error.

FIG. 3 shows a method 300 for substantially canceling quadrature error in a MEMS gyroscope (e.g., MEMS gyroscope 200). A proof mass is vibrated at a pre-determined frequency (e.g., through drive circuit 206) (step 302). In one implementation, the proof mass is vibrated at a resonant frequency associated with the proof mass. In response to a rotation of the MEMS gyroscope, a change in position of a sense mass is sensed (e.g., through an electrode) (step 304). In one implementation, the change in position of the sense mass (e.g., the amplitude of vibration of the sense mass) is sensed as a change in (electrical) charge or capacitance.

A quadrature error cancellation signal is generated (e.g., by quadrature error cancellation signal circuit 210) (step 306). The quadrature error cancellation signal is used to substantially cancel quadrature error from the sensed change in position of the sense mass (step 308). In one implementation, the quadrature error cancellation signal is capacitively coupled to a capacitance signal that represents the sensed change in charge (as measured by the electrode) to substantially cancel quadrature error from the capacitance signal. The sensed change in position of the sense mass is then converted to a voltage or current (e.g., through sense mass position sensor circuit 208) (step 310). By substantially removing quadrature error from the capacitance signal prior to converting the capacitance signal into a voltage or current, less dynamic range is required within circuits that sense the change in position of the sense mass and, consequently, the resulting effective signal-to-noise performance of the MEMS gyroscope is improved.

Figure 4:
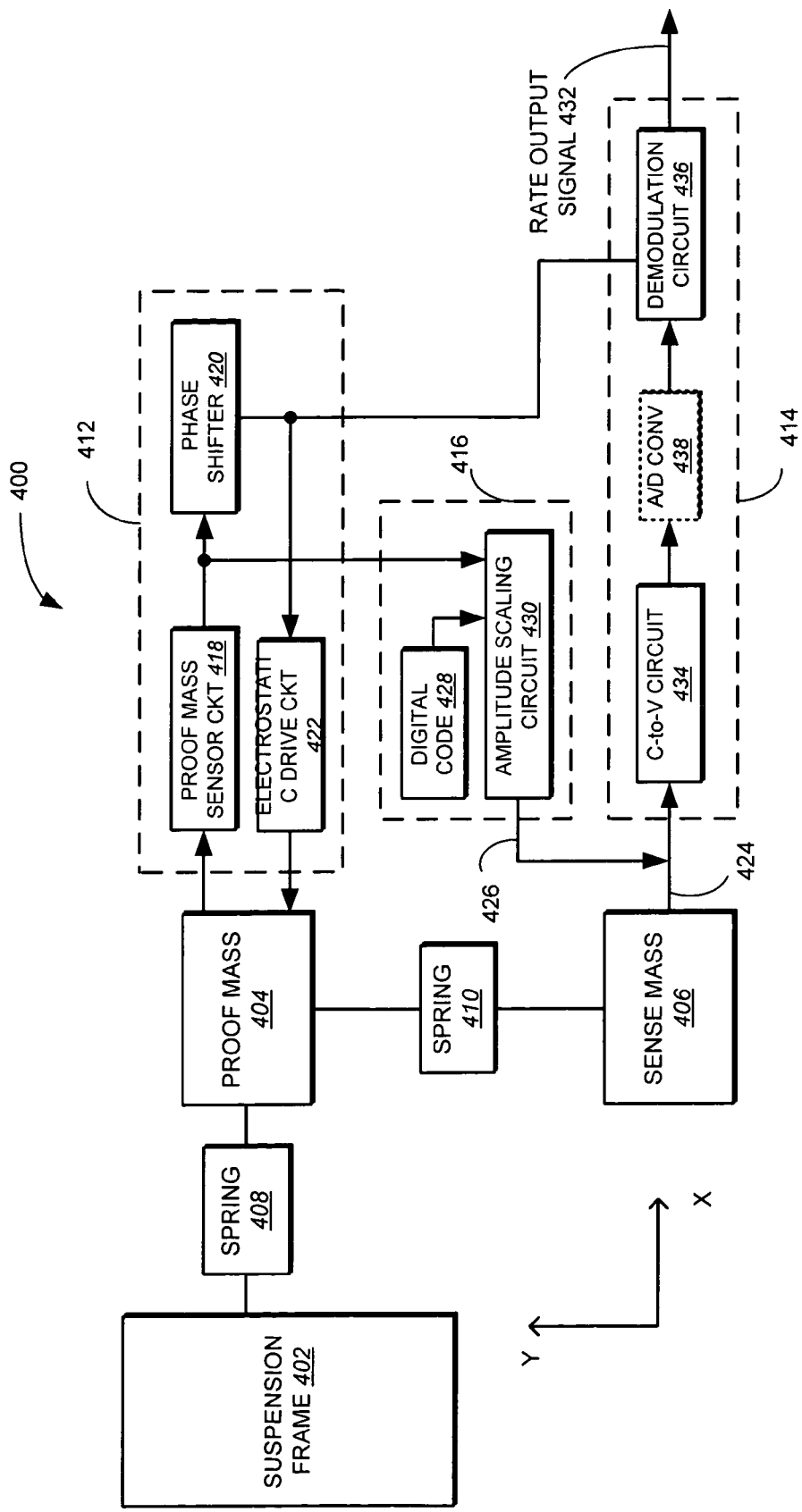
FIG. 4 shows a block diagram of a MEMS gyroscope in accordance with the invention.

FIG. 4 shows one implementation of a MEMS gyroscope 400 in accordance with the invention. MEMS gyroscope 400 includes a suspension frame 402, a proof mass 404, a sense mass 406, springs 408-410, a drive circuit 412, a sense mass position sensor circuit 414, and a quadrature error cancellation circuit 416.

In operation, drive circuit 412 vibrates proof mass 404 at a pre-determined frequency in a drive axis (e.g., along the x-axis). In one implementation, drive circuit 412 includes a proof mass sensor circuit 418, a phase shifter 420, and an electrostatic drive circuit 422. In one implementation, proof mass sensor circuit 418 capacitively senses the position of proof mass 404 as proof mass 404 vibrates in the drive axis. In one implementation, phase shifter 420 introduces a phase shift of (90) degrees to an output of proof mass sensor circuit 418 to ensure oscillation (or vibration) of proof mass 404. Accordingly, electrostatic drive circuit 422 receives the phase shifted output from phase shifter 420 to drive proof mass 404. In this implementation, phase shifter 420 introduces a phase shift of (90) degrees relative to the motion of proof mass 404 to provide the (180) degree shift needed to ensure oscillation of proof mass 404. In another implementation, phase shifter 420 can introduce a phase shift of (0) degrees relative to the motion of proof mass 404.

In response to a rotation of MEMS gyroscope 400, in one implementation, an electrode (not shown) senses a change in position of sense mass 406 and generates a capacitance signal 424 representing the sensed change in position of sense mass 406. Quadrature error cancellation circuit 416 generates a quadrature error cancellation signal 426 to substantially cancel quadrature error from capacitance signal 424. In one implementation, quadrature error cancellation circuit 416 capacitively couples a (0) or (180) degree shifted and scaled version of an output of proof mass sensor circuit 418, as discussed in greater detail below.

In one implementation, quadrature error cancellation circuit 416 includes digital code (or binary code) stored in a non-volatile memory 428 and an amplitude scaling circuit 430. In one implementation, quadrature error cancellation signal 426 is derived from the same signal used to drive proof mass 404. According to this implementation, amplitude scaling circuit 430 attenuates (or scales) the output of proof mass sensor circuit 418 based on one or more scale factors. The scale factors (and sign of the scale factors) used to attenuate the output of proof mass sensor circuit 418 can be determined during production testing by varying a digital code (representing a particular scale factor) which, in one implementation, is stored in a non-volatile memory 428. In one implementation, during production testing the digital code can be varied based on measuring an output of the electrode (not shown) (that senses a change in position of sense mass 406) when no rotation is present and varying the amplitude of quadrature error cancellation signal 426 until the quadrature error in the output of the electrode is minimized. Accordingly, during operation, amplitude scaling circuit 430 selects a digital code having a (pre-determined) sign and scale factor to scale the output of proof mass sensor circuit 418 to substantially cancel quadrature error from the output of the electrode.

Sense mass position sensor circuit 414 receives capacitance signal 424 having quadrature error substantially cancelled therefrom, and converts the received signal into a rate output signal 432 that represents the measured rate of rotation of MEMS gyroscope 400. In one implementation, sense mass position sensor circuit 414 includes a C-to-V circuit 434 and a demodulation circuit 436. C-to-V circuit 434 converts capacitance signal 424 (having quadrature error substantially cancelled therefrom) into a corresponding voltage, and demodulation circuit 436 demodulates the corresponding voltage to produce rate output signal 432. In one implementation, the output of phase shifter 420 is used to demodulate the corresponding voltage generated by C-to-V circuit 434. As shown in FIG. 4, in one implementation, MEMS gyroscope 400 can optionally include an analog-to-digital converter (A/D Conv) 438 to convert the analog voltage output from C-to-V circuit 434 into a corresponding digital signal. In this implementation, demodulation circuit 436 demodulates the corresponding digital signal from analog-to-digital converter 438 in the digital domain to produce a digital rate output signal 432.

Figure 5:
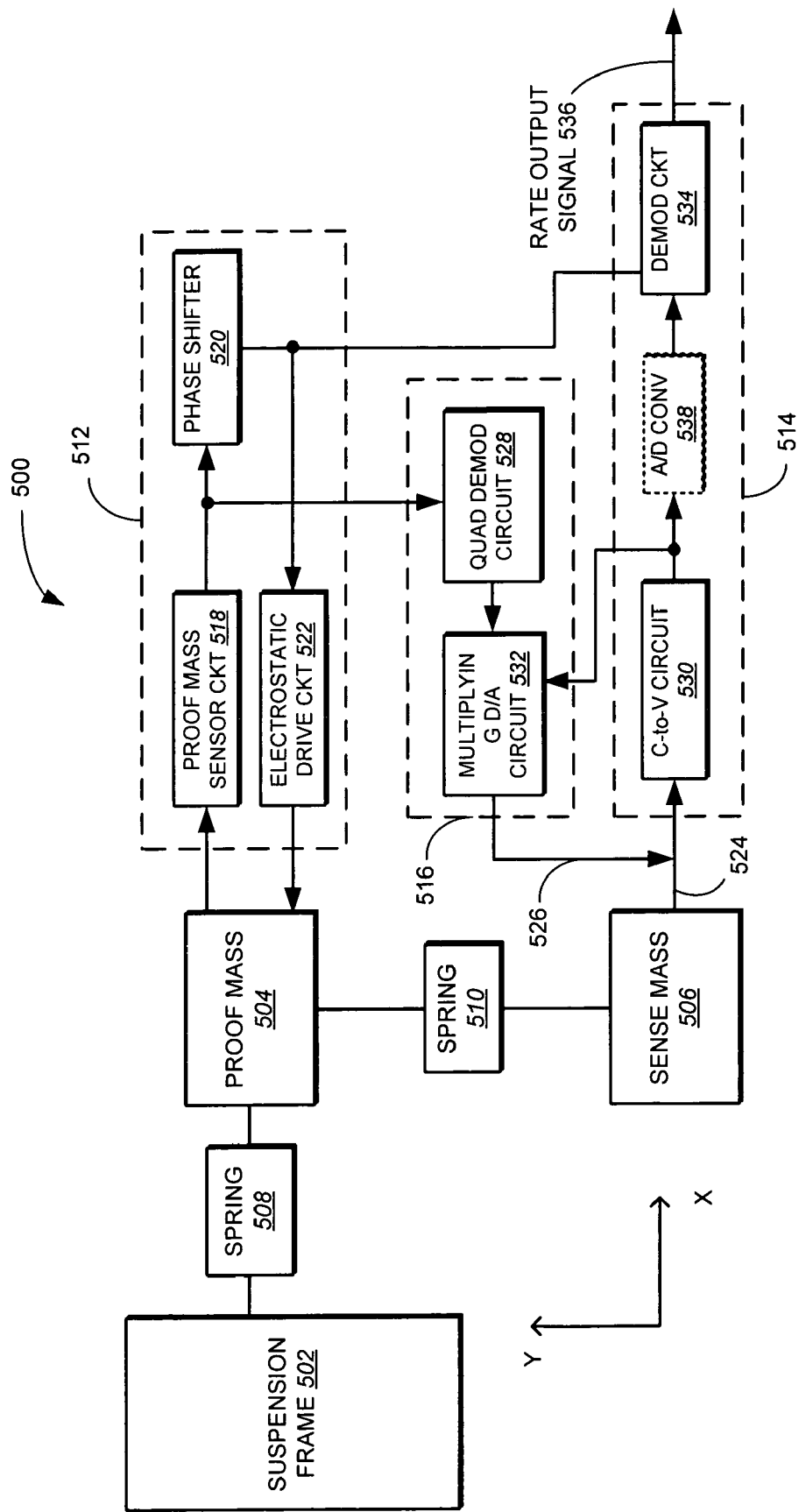
FIG. 5 shows a block diagram of a MEMS gyroscope in accordance with the invention.

FIG. 5 shows one implementation of a MEMS gyroscope 500 in accordance with the invention. MEMS gyroscope 500 includes a suspension frame 502, a proof mass 504, a sense mass 506, springs 508-510, a drive circuit 512, a sense mass position sensor circuit 514, and a quadrature error cancellation circuit 516.

In operation, drive circuit 512 vibrates proof mass 504 at a pre-determined frequency in a drive axis (e.g., along the x-axis). In one implementation, drive circuit 512 includes a proof mass sensor circuit 518, a phase shifter 520, and an electrostatic drive circuit 522. In one implementation, proof mass sensor circuit 518, a phase shifter 520, and an electrostatic drive circuit 522 each operates similar to corresponding circuits discussed above in connection with FIG. 4.

In response to a rotation of MEMS gyroscope 500, in one implementation, an electrode (not shown) senses a change in position of sense mass 506 and generates a capacitance signal 524 representing the sensed change in position of sense mass 506. Quadrature error cancellation circuit 516 generates a quadrature error cancellation signal 526 to substantially cancel quadrature error from capacitance signal 524. In one implementation, quadrature error cancellation signal 526 is generated by a feedback loop that runs continuously to minimize the effect of quadrature error within capacitance signal 524. In this implementation, quadrature error cancellation circuit 516 includes a quadrature demodulation circuit 528 that receives as inputs an output from proof mass sensor circuit 518 and an output from a C-to-V circuit 530 within sense mass position sensor circuit 514. Quadrature demodulation circuit 528 accordingly measures the quadrature error contained within capacitance signal 524 while MEMS gyroscope 500 is rotating, and a multiplying digital-to-analog converter (D/A) circuit 532 scales and sets the polarity of an output of quadrature demodulation circuit 528. In one implementation, the scaled signal—i.e., quadrature cancellation signal 526—is capacitively coupled to capacitance signal 524 to substantially cancel quadrature error from capacitance signal 524.

Sense mass position sensor circuit 514 receives capacitance signal 524 having quadrature error substantially cancelled therefrom, and converts the received signal into a rate output signal 536 that represents the measured rate of rotation of MEMS gyroscope 500. In one implementation, sense mass position sensor circuit 514 includes a C-to-V circuit 530 and a demodulation circuit 534. C-to-V circuit 530 converts capacitance signal 524 (having quadrature error substantially cancelled therefrom) into a corresponding voltage, and demodulation circuit 534 demodulates the corresponding voltage to produce rate output signal 536. In one implementation, the output of phase shifter 520 is used to demodulate the corresponding voltage generated by C-to-V circuit 530. In one implementation, MEMS gyroscope 500 can optionally include an analog-to-digital converter (A/D Conv) 538 to convert the analog voltage output from C-to-V circuit 530 into a corresponding digital signal. In this implementation, demodulation circuit 534 demodulates the corresponding digital signal from analog-to-digital converter 438 in the digital domain to produce digital rate output signal 536.

Various implementations for substantially cancelling quadrature error have been described. Nevertheless, one of ordinary skill in the art will readily recognize that various modifications may be made to the implementations, and any variation would be within the spirit and scope of the present invention. For example, methods described above can be performed in a different order to achieve desirable results. In addition, though MEMS gyroscopes 400, 500 are illustrated as having C-to-V circuits, each of MEMS gyroscopes 400, 500 can instead include C-to-I circuits. In addition, although the invention has been described with respect to a single-axis (Z-axis) MEMS gyroscope, the invention is applicable to dual-axis MEMS gyroscopes (as described in U.S. Pat. No. 6,892,575 referenced above) and multiple-axis gyroscopes. Accordingly, many modifications may be made by one of ordinary skill in the art without departing from the spirit and scope of the following claims.

What is claimed is:

1. A method for detecting a rate of rotation, the method comprising:
    vibrating a proof mass at a pre-determined frequency in a drive axis;
    in response to a rotation, sensing an amount of deflection of the proof mass in an axis orthogonal to the drive axis, the amount of deflection being sensed as a change in charge; and
    generating a quadrature error cancellation signal to substantially cancel quadrature error from the sensed change in charge, including capacitively coupling the quadrature error cancellation signal to the sensed change in charge to substantially cancel quadrature error from the sensed change in charge.

2. The method of claim 1, further comprising converting the sensed change in charge having quadrature error substantially removed therefrom into a corresponding voltage or current.

3. The method of claim 2, wherein generating a quadrature error cancellation signal includes generating the quadrature error cancellation signal based on a feedback loop that runs continuously to substantially cancel quadrature error from the sensed change in charge.

4. The method of claim 3, wherein generating the quadrature error cancellation signal based on a feedback loop includes measuring an amount of quadrature error contained within the corresponding voltage or current using a drive signal that is used to vibrate the proof mass as a reference.

5. The method of claim 1, wherein the quadrature error cancellation signal is derived from a drive signal within a drive circuit that is used to vibrate the proof mass.

6. The method of claim 5, further comprising scaling the drive signal, and wherein generating the quadrature error cancellation signal includes generating the quadrature error cancellation signal based on the scaled drive signal.

7. The method of claim 6, further comprising:
    storing one or more pre-determined digital codes that each represents a particular scale factor for scaling the drive signal; and
    wherein scaling the drive signal includes scaling the drive signal based on a selected one of the one or more pre-determined digital codes to minimize quadrature error within the sensed change in charge.

8. The method of claim 7, wherein the one or more pre-determined digital codes are determined during production testing of a sensor including the proof mass.

9. A sensor operable to detect a rate of rotation, the sensor comprising:
a proof mass;
a drive circuit to vibrate the proof mass at a pre-determined frequency in a drive axis;
an electrode operable to sense an amount of deflection of the proof mass in an axis orthogonal to the drive axis in response to a rotation of the sensor, the electrode sensing the amount of deflection as a change in charge; and
a quadrature error cancellation circuit operable to generate a quadrature error cancellation signal to substantially cancel quadrature error from the sensed change in charge,
wherein the quadrature error cancellation signal is capacitively coupled to the sensed change in charge to substantially cancel quadrature error from the sensed change in charge.

10. The sensor of claim 9, further comprising a sense mass position sensor circuit operable to receive the sensed change in charge having quadrature error substantially removed therefrom and convert the received sensed change in charge into a corresponding voltage or current.

11. The sensor of claim 10, wherein the quadrature error cancellation circuit generates the quadrature error cancellation signal based on a feedback loop that runs continuously to substantially cancel quadrature error from the sensed change in charge.

12. The sensor of claim 11, wherein the quadrature error cancellation circuit includes a demodulator operable to measure an amount of quadrature error contained within a signal from the sense mass position sensor circuit using a drive signal that is used to vibrate the proof mass within the drive circuit as a reference.

13. The sensor of claim 9, wherein the quadrature error cancellation signal is derived from a drive signal within the drive circuit that is used to vibrate the proof mass.

14. The sensor of claim 13, wherein the quadrature error cancellation circuit includes an amplitude scaling circuit operable to scale the drive signal and generate the quadrature error cancellation signal based on the scaled drive signal.

15. The sensor of claim 14, wherein:
the quadrature error cancellation circuit further includes a memory operable to store one or more pre-determined digital codes that each represents a particular scale factor for scaling the drive signal; and
the amplitude scaling circuit scales the drive signal based on a selected one of the one or more pre-determined digital codes to minimize quadrature error within the sensed change in charge.

16. The sensor of claim 15, wherein the one or more pre-determined digital codes are determined during production testing of the sensor.

17. The sensor of claim 9, wherein the sensor comprises a single-axis MEMS gyroscope, a dual-axis MEMS gyroscope, or a multiple axis MEMS gyroscope.

* * * * *